Jan. 12, 1937.                    H. H. TALBOT                    2,067,513
                         BEARING FOR A VARIABLE SPEED DRIVE
                              Filed Feb. 23, 1935              2 Sheets-Sheet 2
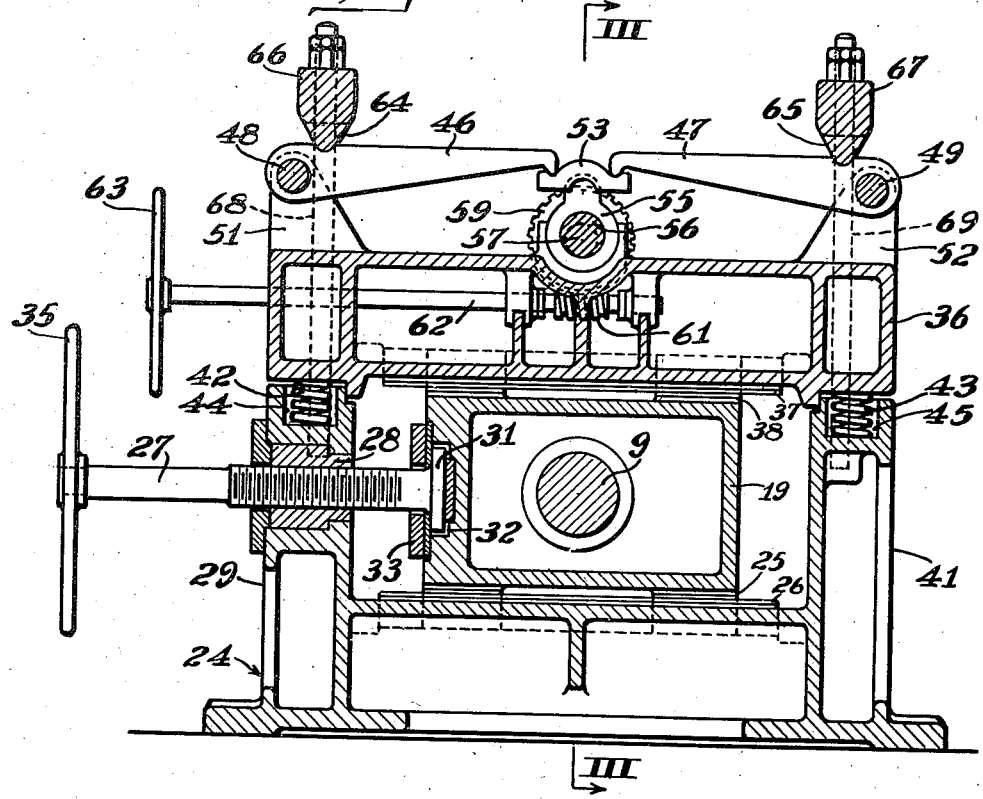
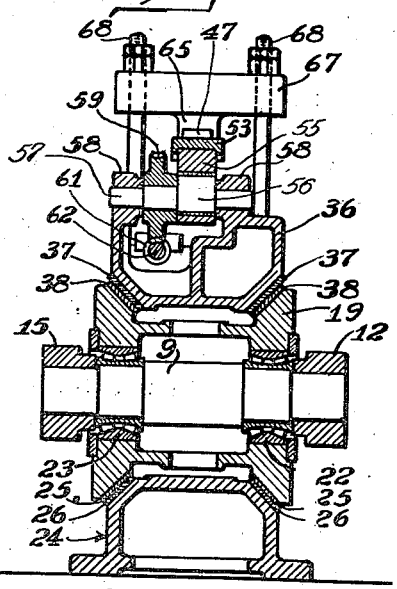

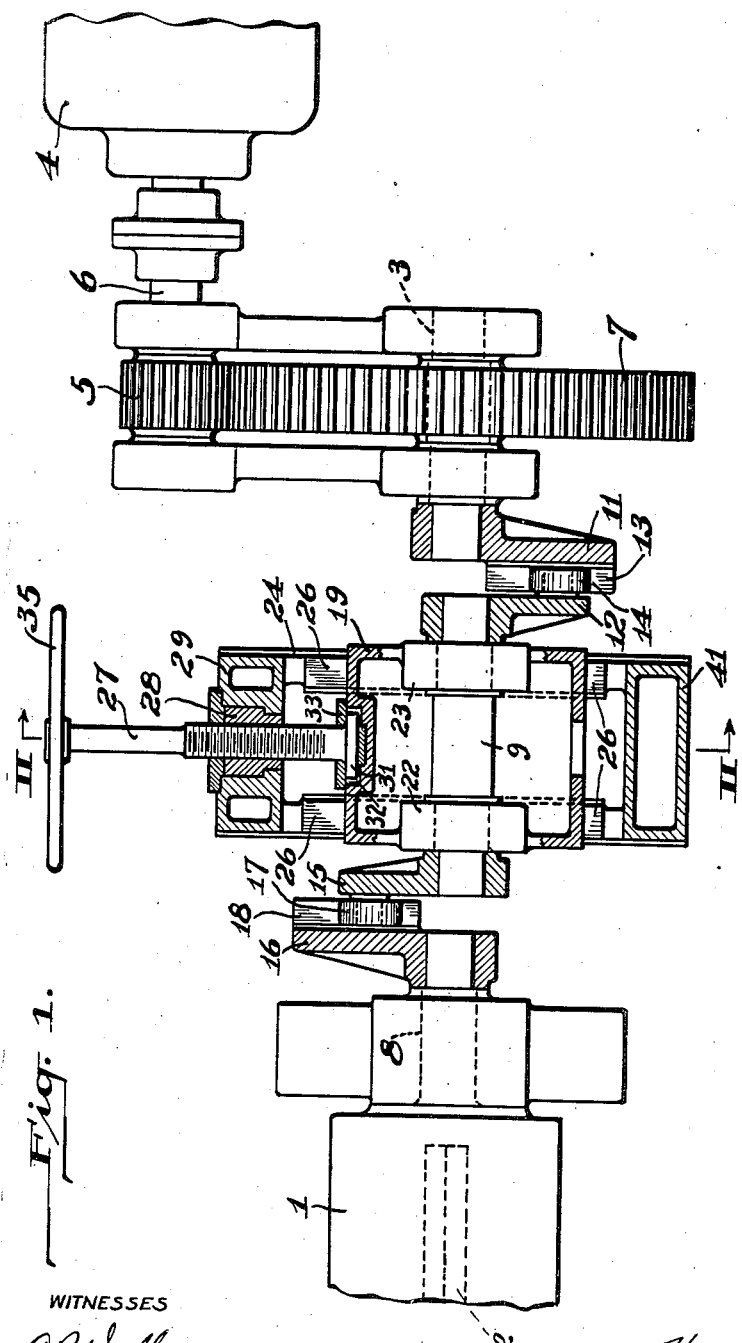

Patented Jan. 12, 1937

2,067,513

UNITED STATES PATENT OFFICE 2,067,513

BEARING FOR A VARIABLE SPEED DRIVE

Howard H. Talbot, Pittsburgh, Pa., assignor to United Engineering & Foundry Company, Pittsburgh, Pa., a corporation of Pennsylvania Application February 23, 1935, Serial No. 7,863

7 Claims. (Cl. 308—59)

This invention relates to a variable speed drive and particularly to a drive of the type used to convert uniform rotary movement delivered by a constantly actuated driving element into a variable rotary movement, and while not necessarily so limited in its use it is especially devised for driving a flying shear such as is employed to sever metallic strip into sections while it is in motion.

An object of the invention is to provide a sturdy and dependable drive of this character and one which can be readily and easily adjusted to vary the form of speed which is delivered by it to the element to which it is connected.

A more particular object is to provide a novel construction for securely and firmly holding the eccentrically adjustable speed conversion element of the drive in a selected operating position, and for doing so in such a way as to permit its being easily and quickly adjusted.

These and various other objects as well as the various other novel features and advantages of the invention will be apparent when the following detailed description is read in conjunction with the accompanying drawings of which Fig. 1 is a view partly in section and partly in plan of a flying shear equipped with a drive constructed in accordance with the invention; Fig. 2 a vertical section taken on the line II—II of Fig. 1; and Fig. 3 a vertical section taken on the line III—III of Fig. 2.

Referring in detail to this embodiment of the invention, the numeral 1 designates one of the blade carriers and the numeral 2 one of the cutting blades of a rotary-type flying shear of the kind used for cutting metal strip into sections of predetermined length while it is in motion.

In order for a shear of this kind to produce cuts of different lengths, it is necessary to actuate the blades thereof at different rotary speeds with respect to the speed of the stock and for them to function properly, that is, to produce satisfactory cuts and at the same time not interfere with the movement of the material, it is necessary for them to travel at substantially the same forward speed as the material during the period in their movement when they are intersecting the material or its path of travel.

To accomplish this, the blades must be operated at one speed when cutting and at a different speed between cuts. In other words, as the elements used to drive these and other devices having the same operating characteristics invariably have no other than a uniform rotary movement, it is necessary to convert such movement into a variable rotary movement.

In accordance with this invention this is accomplished by using a drive whereby the driving element is connected to the shear, or whatever element is being driven, by means of an eccentrically adjustable intermediary shaft through the aid of cranks and sliding crank pins or the like. A fault of such drives as heretofore constructed and which has retarded their use for heavy-duty operations, such as the driving of metal shears has been that they have not been provided with a satisfactory mounting for this adjustable intermediary driving shaft, and it is the solution of this problem toward which this invention is more particularly directed.

Referring to the drawings in the particular embodiment of the invention illustrated, a shaft 3 is shown as comprising the power shaft of the drive, being connected for direct actuation by a motor 4 through the use of a pinion 5 mounted on the drive shaft 6 of the motor and a gear 7 which is keyed to the shaft 3 itself. Between it and a shaft 8 in alignment therewith, which is connected to the blade carriers 1 of the rotary shear being operated by the drive, is an adjustable intermediary shaft 9 which is arranged in parallelism with the other two shafts 3 and 8 and disposed for adjustment into and out of alignment therewith.

For connecting this latter or adjustable shaft 9 to the shaft 3, a pair of cranks 11 and 12 is keyed to their two adjacent ends. In one of these cranks there is provided a pin-receiving groove 13 and on the other, a roller-equipped wrist pin 14 is mounted to slide in such groove and transmit movement from the first to the second-mentioned crank when the former is actuated by the power shaft 3. At its opposite end the adjustable shaft 9 is coupled by a similar connection to the driven shaft 8, such coupling comprising a pair of cranks 15 and 16 equipped with a cooperating and interengaging wrist pin 17 and groove 18.

With such an arrangement, as is known to the art, by moving the shaft 9 into and out of concentricity with the shafts 3 and 8 a speed is imparted to the driven shaft 8 from the driving shaft which is of a variable character and which differs at different points in its cycle according to the extent which the shaft 9 is out of concentricity with the other shafts. As is also known this speed will vary at each instant in the cycle with the distance which the wrist pins on the cranks 12 and 15 are displaced from the center of the driving shaft 3.

With this in mind it is apparent that through the use of such drive it is possible to operate the carriers such as the carrier 1 of a flying shear at different over-all rotary speeds to produce cuts of different lengths on material traveling at a fixed speed and at the same time modify the speed of the cutting blades at the instant they produce a cut so that, independently of the over-all speed of the shear, they will be traveling at the speed of the material at the instant of cutting. As will be appreciated, however, due to the relatively large size of these shears and the correspondingly large torques which must be transmitted to them by the drive, it is necessary, in order to produce a satisfactory drive, to provide a very stable support for the intermediary shaft 9, and, in order to be practical, one which can be readily adjusted to meet the operating requirements of the shear.

In accordance with this invention, to accomplish this latter requirement, a mounting is provided for the shaft 9 which comprises a rectangular box-like bearing housing 19 in the sides of which are provided bearing supports 22 and 23 for the two ends of the shaft 9. To provide for adjusting the shaft 9 relative to the driving and driven shafts 3 and 8, this housing is slidably mounted on a supporting base 24, and to guide and facilitate its movement thereon, it is equipped with a pair of inclined bearing plates 25 whch are disposed to engage and move upon cooperating bearing or slide plates 26 secured to the base 24.

For effecting its adjustment this shaft-supporting housing has an adjusting screw 27 pivotally secured to it which is supported in a fixed threaded bushing 28 located in an upright portion 29 of the base 24 opposite the adjacent end of the housing. The inner end of this screw is secured to the housing by an enlargement 31 which is disposed in a recess 32 formed therein and held firmly against displacement from the housing by a plate 33 whereby the housing 19 is caused to move whenever the screw is turned by a hand-wheel 35 which is mounted on its outer end for such purpose.

To firmly hold the shaft 9 in a selected operative position when the drive is in operation a clamping head 36 is provided and disposed to engage the top surface of the housing 19 being equipped with a pair of inclined slide plates 37 at its side edges which are arranged to cooperatively engage a pair of similarly inclined slide plates 38 mounted lengthwise of the housing 19 along its upper edges and adapted to facilitate the movement of such housing when it is being adjusted. As shown, this bearing head is adapted to rest at one end on the upright 29 in which the screw 27 is supported and at the other end on a similar upright 41 secured to the base 24 at its opposite end.

To carry the weight of such upper clamping head 36 and thereby to permit relatively free movement of the housing 19 when the head is so supported, a pair of compression springs 42 and 43 is provided and located in recesses 44 and 45 formed in the upper ends of the uprights 29 and 41 with their upper ends normally projecting above the tops of the uprights sufficiently to lift the head 36 away from the housing 19. While for clamping the head 36 against the housing 19 and for doing so in such a way as to firmly hold the shaft 9 in place under all conditions of operation, a pair of levers 46 and 47 is mounted on pivot pins 48 and 49 supported in bifurcated brackets 51 and 52 secured to the upper outer ends of the bearing head 36. The inner ends of these levers are disposed to engage a saddle 53 mounted on a pressure applying element 55 secured to an eccentric 56 carried by a shaft 57 that is mounted in suitable brackets 58 in the center of the clamping head 36 and equipped with a worm-wheel 59 disposed to be operated by a worm 61 secured to a shaft 62 that is extended to the end of the clamping head 36 and provided with a hand-wheel 63 for operating it. Between the saddle 53 and the pivot pins 48 and 49 on which the levers 46 and 47 are mounted, there is arranged a pair of bladelike fulcrums 64 and 65 which are supported on cross-heads 66 and 67 secured to the uprights 29 and 41 of the base 24 by suitable rods 68 and 69 and disposed to engage the upper surface of the levers 46 and 47 adjacent the pivot pins, whereby the clamping head 36 is effectively and firmly forced downwardly against the shaft-supporting housing 19 when the clamping shaft 57 is rotated to elevate the pressure element 55 on the eccentric 56 which in being elevated lifts the saddle 53 and forces the outboard ends of the levers 46 and 47 downwardly. To multiply as much as possible the pressure exerted upon the clamping head 36, by action of the pressure element 55 on the levers 46 and 47, the fulcrums 64 and 65 are located as near as is feasible and practical to the pivot pins 48 and 49, respectively.

In operating the device when it is desired to adjust the shaft 9 to a required operating position, the hand-wheel 63 is first turned to release the pressure on the clamping levers 46 and 47. When this pressure is released the springs 44 and 45 automatically lift the clamping head 36 out of contact with the shaft-supporting housing 19 or sufficiently relieve the pressure therebetween to permit this housing to be readily moved. The adjusting screw 27 is then turned to adjust the housing 19 and the intermediary shaft 9 to the position desired. When properly positioned the hand-wheel 63 is rotated until the eccentric 56 exerts the required pressure upon the clamping levers 46 and 47 to securely clamp the housing 19 against movement by the operating forces encountered.

As will be readily appreciated by those skilled in the art, this construction is sufficiently rigid to provide a very firm and satisfactory support for the adjustable intermediary shaft of the drive and is at the same time so designed as to easily and readily permit the adjustment of the adjustable shaft.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In combination with a rotatable power transmitting shaft, a bearing housing for supporting said shaft, a base on which said housing is disposed to move, means for moving said bearing housing and shaft laterally of the axis thereof, a releasable head for clamping said bearing housing onto said base, yieldable means normally urging said head out of contact with said housing, and pressure-multiplying means for firmly clamping said head against said housing.

2. In combination with a rotatable power transmitting shaft, a bearing housing for supporting said shaft, a base on which said housing is disposed to move, means for moving said bearing housing and shaft laterally of the axis thereof, a releasable head for clamping said bearing housing onto said base, interfitting bearing and guiding members on said head, said bearing support and said base, yieldable means normally urging said head out of contact with said housing, and a releasable pressure-multiplying mechanism for firmly clamping said head against said housing.

3. In combination with a rotatable power transmitting shaft, a bearing support for said shaft, a base on which said bearing support moves, a releasable head for clamping said bearing support to said base, a pair of levers pivotally secured at their outer ends to the end of said bearing support, means provided on said head for forcibly adjusting the inner ends of said levers, and fulcrum elements secured to said base disposed to engage said levers adjacent their pivotally supported ends.

4. In combination with a rotatable power transmitting shaft, a bearing housing for supporting said shaft, a base on which said housing is disposed to move, means for moving said bearing housing and shaft laterally of the axis thereof, a releasable head for clamping said bearing housing onto said base, a pair of levers pivotally secured at their outer ends on said head, means at the center of said head for engaging the free ends of said levers, means operable from the side of said head for forcibly raising and lowering said lever-engaging means, and fulcrum elements secured to said base disposed to engage the upper sides of said levers adjacent their pivotally supported ends.

5. In combination with a rotatable power transmitting shaft, a bearing housing for supporting said shaft, a base on which said housing is disposed to move, an adjusting screw extended through a projection on said base and connected to said housing for moving said bearing housing and shaft laterally thereof, a releasable head for clamping said bearing housing onto said base, coil springs located between said head and said base for normally urging said head out of contact with said housing, a pair of levers pivotally secured at one end on said head, a bearing means disposed in the center of said head for engaging the free ends of said levers, an eccentric for raising and lowering said lever-engaging means, screw means for actuating said eccentric, and a pair of fulcrum elements rigidly secured to said base disposed to engage the upper side of said levers between their two ends.

6. In a variable speed drive comprising a power input shaft, a power delivery shaft in alignment with but spaced from said input shaft, an intermediary shaft parallel with but movable into and out of alignment with said other shafts, and a variable connection between the ends of said intermediary shaft and said input and delivery shafts, a bearing support for said intermediary shaft, a base on which said bearing support moves, and a releasable head for clamping said bearing support to said base.

7. In a variable speed drive comprising a power input shaft, a power delivery shaft in alignment with but spaced from said input shaft, an intermediary shaft parallel with but movable into and out of alignment with said other shafts, and a variable connection between the ends of said intermediary shaft and said input and delivery shafts, a bearing support for said intermediary shaft, a base on which said bearing support moves, a relasable head for clamping said bearing support to said base, and a releasable mechanism for applying a pressure to said head.

HOWARD H. TALBOT.